(12) United States Patent
Cheng

(10) Patent No.: US 8,627,577 B2
(45) Date of Patent: Jan. 14, 2014

(54) APPARATUS OF CHECKING DIMENSIONS OF MEMORY CARD

(75) Inventor: I Chi Cheng, Kaohsiung (TW)

(73) Assignee: Orient Semiconductor Electronics, Limited, Kaohsiung (TW)

(*) Notice: Subject to any disclaimer, the term of this patent is extended or adjusted under 35 U.S.C. 154(b) by 195 days.

(21) Appl. No.: 13/337,185

(22) Filed: Dec. 26, 2011

(65) Prior Publication Data

US 2012/0192445 A1 Aug. 2, 2012

(30) Foreign Application Priority Data

Feb. 1, 2011 (TW) .............................. 100202386 U

(51) Int. Cl.
*G01B 3/14* (2006.01)
(52) U.S. Cl.
USPC ................................ 33/546; 33/1 BB; 33/562
(58) Field of Classification Search
USPC ......... 33/1 BB, 121, 122, 501, 502, 542, 545, 33/546, 549, 562
See application file for complete search history.

(56) References Cited

U.S. PATENT DOCUMENTS

| 2,202,683 | A | * | 5/1940 | Demsky et al. | 33/549 |
|---|---|---|---|---|---|
| 6,138,371 | A | * | 10/2000 | Lippa et al. | 33/562 |
| 7,788,818 | B1 | * | 9/2010 | Tran et al. | 33/502 |
| 8,122,612 | B2 | * | 2/2012 | Knight et al. | 33/836 |
| 2008/0083127 | A1 | * | 4/2008 | McMurtry et al. | 33/502 |
| 2011/0258867 | A1 | * | 10/2011 | McDonnell et al. | 33/502 |
| 2012/0066922 | A1 | * | 3/2012 | Dreier | 33/502 |

* cited by examiner

*Primary Examiner* — G. Bradley Bennett

(57) ABSTRACT

An apparatus of checking dimensions of an object includes a checking platform. The checking platform has a checking slot extending from one side and arriving at another side thereof. The checking slot is defined by a first side wall, a second side wall and a bottom wall, wherein the first side wall has a front section connecting to a rear section. The second side wall has a middle section connecting to a front section and a rear section, wherein the distance between the front section of the first side wall and the front section of the second side wall is greater than that between the rear section of the first side wall and the rear section of the second side wall, and is smaller than that from a connecting location to the middle section of the second side wall.

16 Claims, 6 Drawing Sheets

APPARATUS OF CHECKING DIMENSIONS OF MEMORY CARD

CROSS REFERENCE TO RELATED APPLICATION

This application claims the priority benefit of Taiwan Patent Application Serial Number 100202386 filed Feb. 1, 2011, the full disclosure of which is incorporated herein by reference.

BACKGROUND OF THE INVENTION

1. Field of the Invention

The present invention relates to an apparatus of checking dimensions of an object, and more particularly, to an apparatus of checking dimensions of a memory card.

2. Description of the Related Art

Memory cards are a kind of compact memory apparatus that may store a great lot of data. The data stored in a memory card may be accessed by inserting it into a dedicated slot provided at an electronic device. However, it is likely that the memory card fails to be inserted into the slot or jams in the slot if the memory card has a wider dimension.

To avoid the above situations, it is required to check the dimensions of a memory card before shipping. A vernier caliper is a common tool to check the dimensions of an object. However, it is not a good idea to use vernier calipers to check the dimensions for a great number of memory cards in a production line. This is because it is more time-consuming and may also introduce an error.

Accordingly, there exists a need to provide a solution to solve the aforesaid problems.

SUMMARY OF THE INVENTION

The present disclosure provides an apparatus of checking dimensions of an object. The dimensions of the object may be checked by only placing the object in the checking slot In one embodiment, the apparatus of checking dimensions of an object is to form a checking slot on a checking platform. The checking slot extends from one side of the checking platform and arrives at another side of the checking platform. The checking slot is defined by a first side wall, a second side wall and a bottom wall, wherein the first side wall has a front section connecting to a rear section, and the front and rear sections intersect with each other at a connecting location. The second side wall has a middle section connecting to a front section and a rear section, wherein the distance between the front section of the first side wall and the front section of the second side wall is greater than that between the rear section of the first side wall and the rear section of the second side wall, and is smaller than that from the connecting location to the middle section of the second side wall. The angle of intersection between the front section of the first side wall and the rear section of the first side wall is greater than 90 degrees and smaller than 180 degrees.

In another embodiment, the apparatus of checking dimensions of an object is to form a checking slot on a checking platform. The checking slot extends from one side of the checking platform and arrives at another side of the checking platform. The checking slot is defined by a first side wall, a second side wall and a bottom wall. The checking slot has a middle section connecting to a front section and a rear section, wherein the front section is wider than the rear section and is narrower than the middle section. An accommodation room is formed at the middle section. A portion of the second side wall located at the middle section of the checking slot is formed to have the checked object rotate and push the checked object to the accommodation room. The rear section is deflected with respect to the front section at an angle that is greater than 90 degrees and smaller than 180 degrees.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
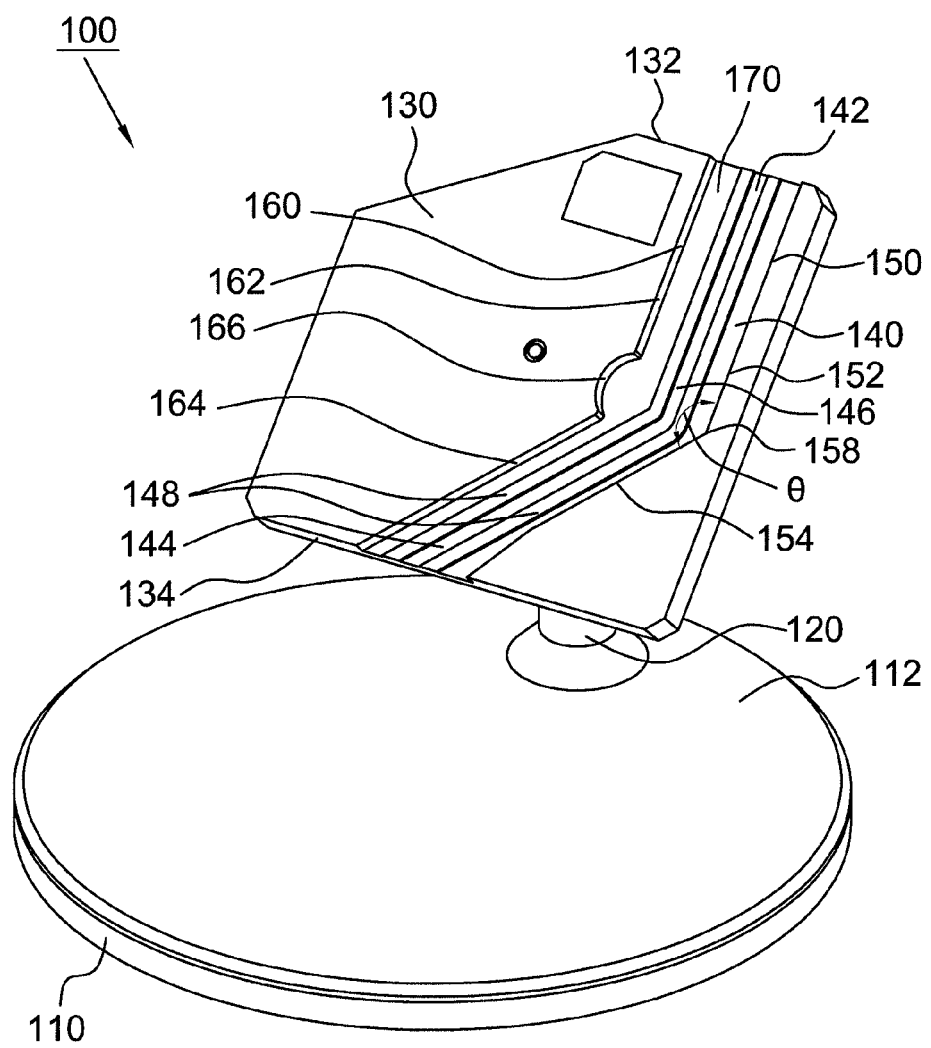
FIG. 1 illustrates the apparatus of checking dimensions of a memory card according to the first embodiment of the present disclosure.

Referring to FIG. 1, the apparatus 100 of checking dimensions of a memory card according to the first embodiment of the present disclosure includes a supporter 120 extending upward from a base 110. A checking platform 130 is mounted at the supporter 120 in an inclined manner and has a checking slot 140 formed thereon. The checking slot 140 has smooth inner walls.

The checking slot 140 extends downward from a side 132 of the checking platform 130 and arrives at another side 134 of the checking platform 130. The checking slot 140 is defined by a bottom wall 170 and two opposing side walls 150, 160. The side wall 150 includes a front section 152 and a rear section 154 connecting to the front section 152. The front and rear sections 152, 154 of the side wall 150 substantially extends straightly and intersect with each other at a connecting location 158, wherein the angle θ of intersection between the front section 152 and the rear section 154 is greater than 90 degrees and smaller than 180 degrees. The side wall 160 includes a front section 162, a rear section 164 and a middle section 166 connecting to the front and rear sections 162, 164. The front section 162 of the side wall 160 has a length smaller than that of the front section 152 of the side wall 150 and rear section 164 of the side wall 160 has a length smaller than that of the rear section 154 of the side wall 150. The front and rear sections 162, 164 of the side wall 160 substantially extends straightly, and are substantially parallel to the front and rear sections 152, 154 of the side wall 150, respectively. The distance between the front section 152 of the side wall 150 and the front section 162 of the side wall 160 is greater than that between the rear section 154 of the side wall 150 and the rear section 164 of the side wall 160. The middle section 166 of the side wall 160 is of curved shape and has a concave toward the side wall 150. The distance from the connecting location 158 to the middle section 166 of the side wall 160 is greater than that between the front section 152 of the side wall 150 and the front section 162 of the side wall 160. According to the apparatus 100 in this embodiment, the checking slot 140 has a front section 142, a middle section 146 and a rear section 144, wherein the front section 142 is wider than the rear section 144 and is narrower than the middle section 146.

Referring to FIGS. 2a to 2d, they illustrate how to check dimensions of a memory card 200 by using the apparatus 100. The memory card 200 to be checked substantially is of rectangular shape and has a pair of parallel long sides 210 and a pair of parallel short sides 220. The memory card 200 further includes a cutting side 230 connecting one of the long sides 210 to one of the short sides 220.

Figure 2A:
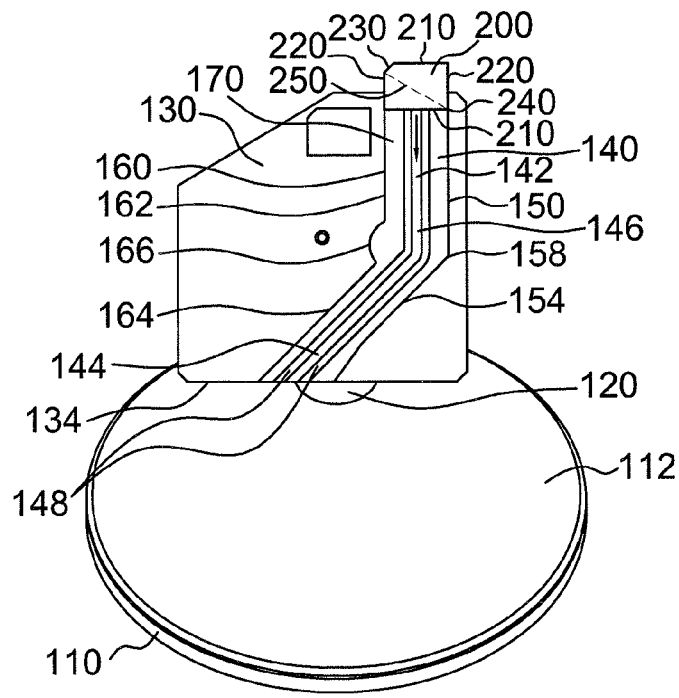
FIGS. 2a to 2d illustrate how to check dimensions of a memory card by using the apparatus of FIG. 1.
Figure 2B:
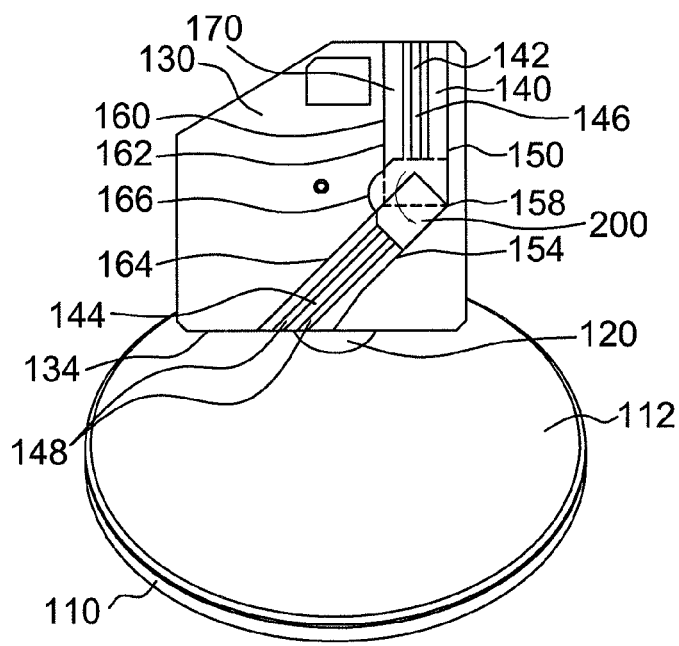
Figure 2C:
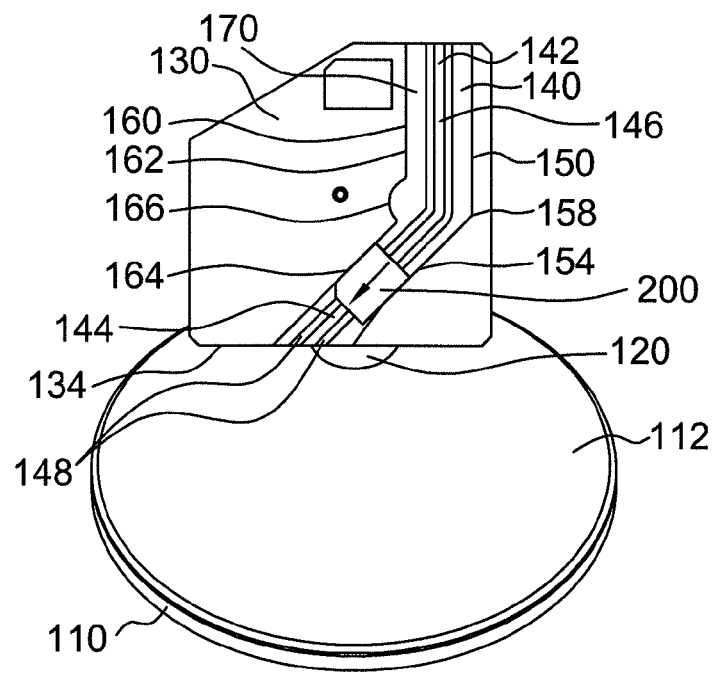
Figure 2D:
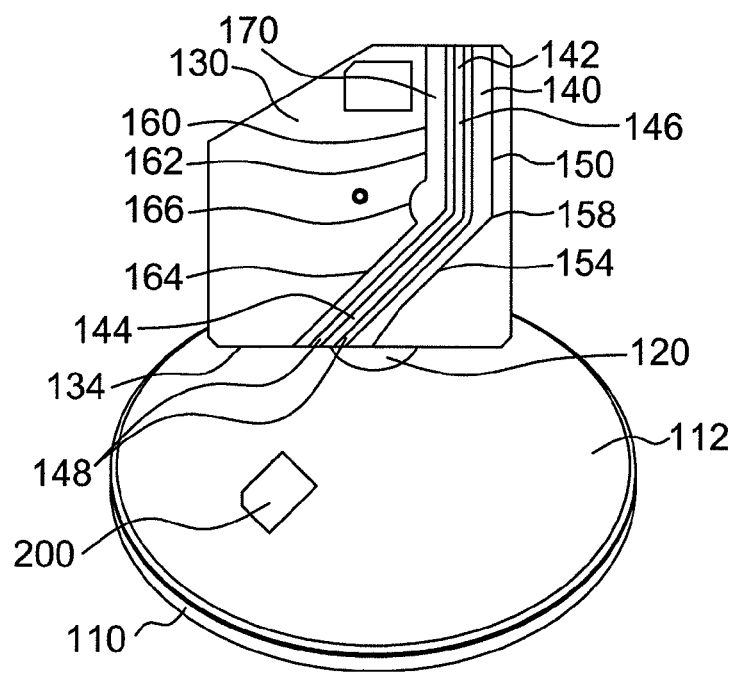

In operation, the memory card 200 is placed in the front section 142 of the checking slot 140 in such a manner that the cutting side 230 is arranged upward and the long side 210 not connecting with the cutting side 230 is arranged downward (see FIG. 2a). The memory card 200 will slide downward in the inclined checking slot 140 because of gravity. When a corner of the memory card 200, the lower right corner 240 in this embodiment, hits a portion of the rear section 154 of the side wall 150 near the connecting location 158, the memory card 200 will make a counterclockwise rotation due to inertia (see FIG. 2b). If the memory card 200 has a width smaller than that of the rear section 144 of the checking slot 140, it will slide into the rear section 144 of the checking slot 140 in a manner that the short side 220 connecting with the cutting side 230 faces downward (see FIG. 2c). Finally, the memory card 200 will slide out of the checking slot 140 and drop down to the base 110 (see FIG. 2d).

According to the apparatus 100 of the present disclosure, if the memory card 200 may be placed in the front section 142 of the checking slot 140 in the manner that the long side 210 faces downward, it indicates that the memory card 200 has a length smaller than the width of the front section 142 of the checking slot 140. When the memory card 200 may slide into the rear section 144 of the checking slot 140, it indicates that the width of the memory card 200 is smaller than that of the rear section 144 of the checking slot 140. Therefore, according to the apparatus 100, the front section 142 of the checking slot 140 is arranged to check the length of the memory card 200, the rear section 144 of the checking slot 140 is arranged to check the width of the memory card 200, and the middle section 146 of the checking slot 140 is configured for the memory card 200 to rotate. According to the apparatus 100 of the present disclosure, when the memory card 200 may slide out of the checking slot 140, it indicates that the dimensions of the memory card 200 are qualified. It is to be noted that the width of the front section 142 of the checking slot 140 should be slightly greater than the standard length of a memory card 200 and the width of the rear section 144 of the checking slot 140 should be slightly greater than the standard width of a memory card 200 in order to check precisely the dimensions of the memory card 200. Furthermore, to prevent the memory card 200 from attaching to the checking slot 140 due to the atmospheric pressure, a plurality of elongated protrusions 148 is formed on the bottom wall 170 of the checking slot 140. The protrusions 148 extend lengthwise along the checking slot 140. This may reduce the contact of the memory card 200 with the bottom wall 170 of the checking slot 140. Therefore, the memory card 200 may slide in the checking slot 140 more smoothly.

Figure 3:
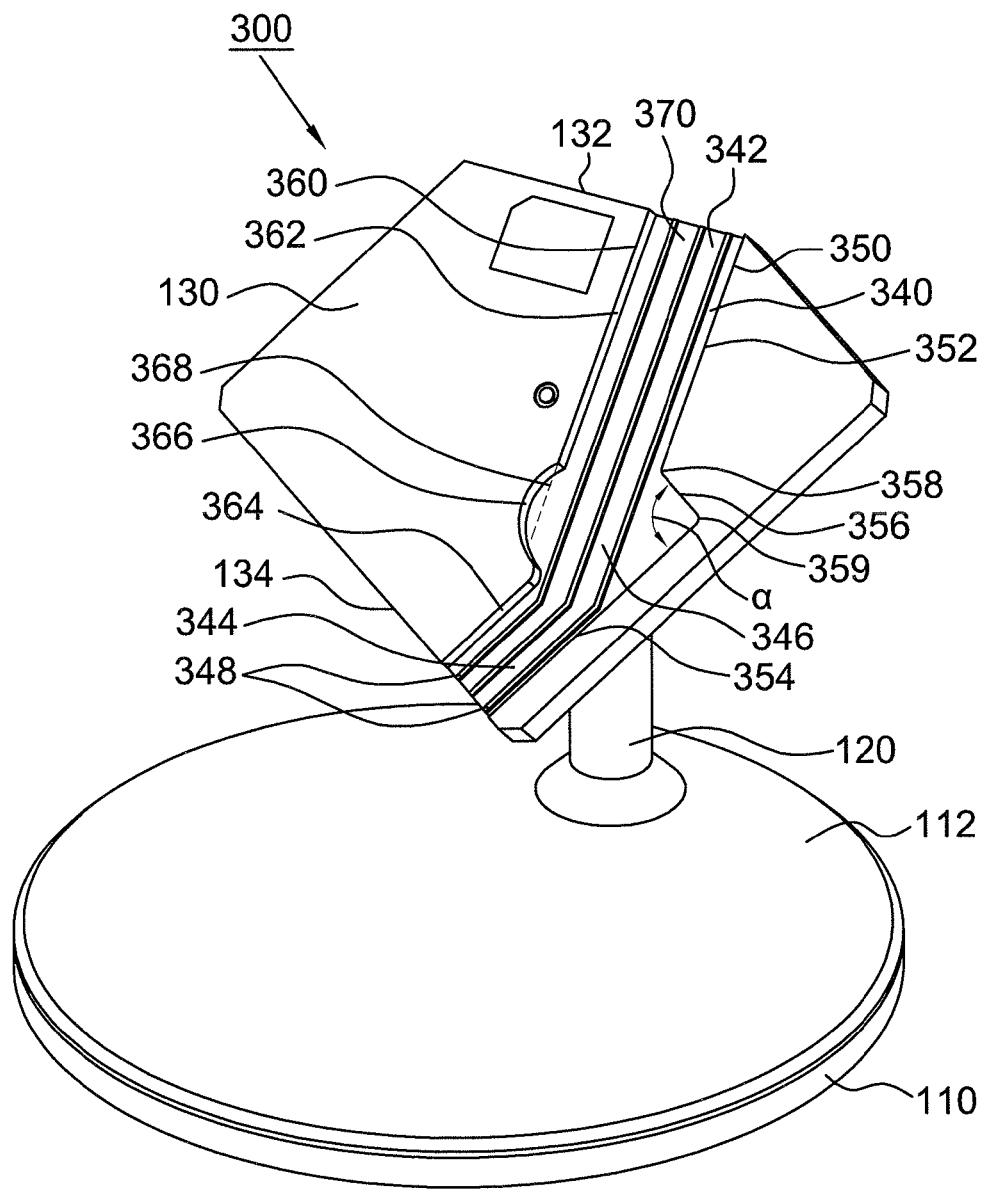
FIG. 3 illustrates the apparatus of checking dimensions of a memory card according to the second embodiment of the present disclosure.
Figure 4A:
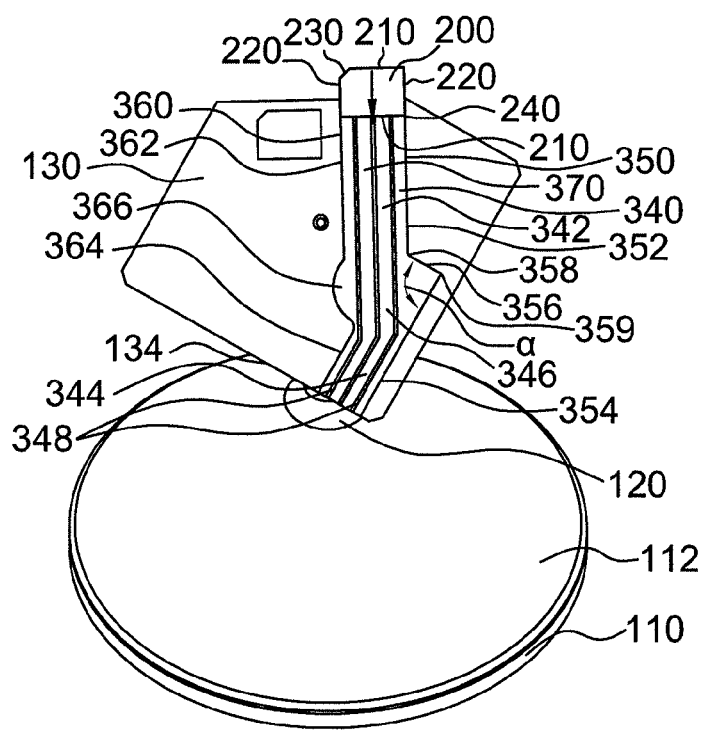
FIGS. 4a to 4d illustrate how to check dimensions of a memory card by using the apparatus of FIG. 3.
Figure 4B:
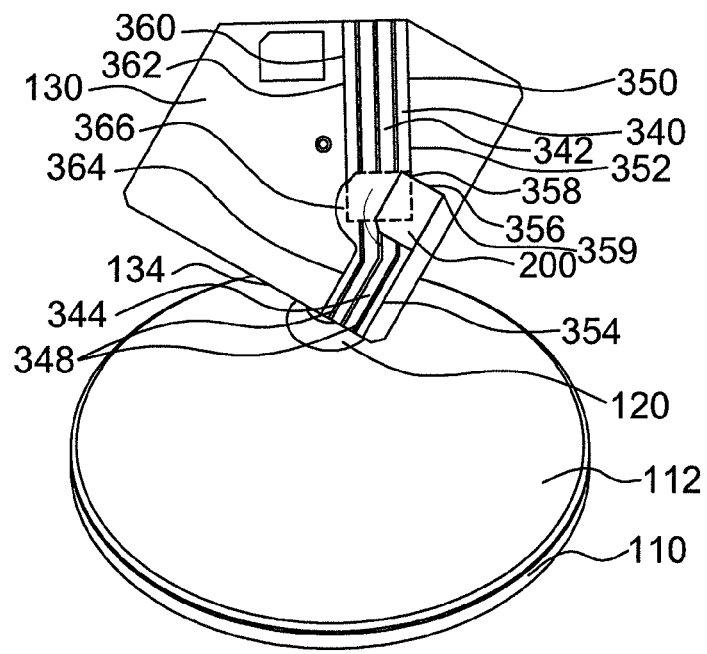
Figure 4C:
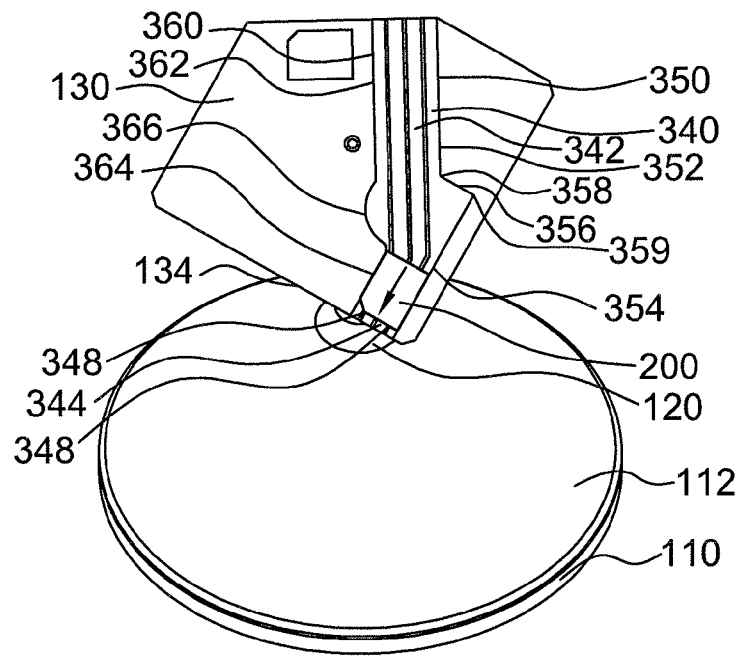
Figure 4D:
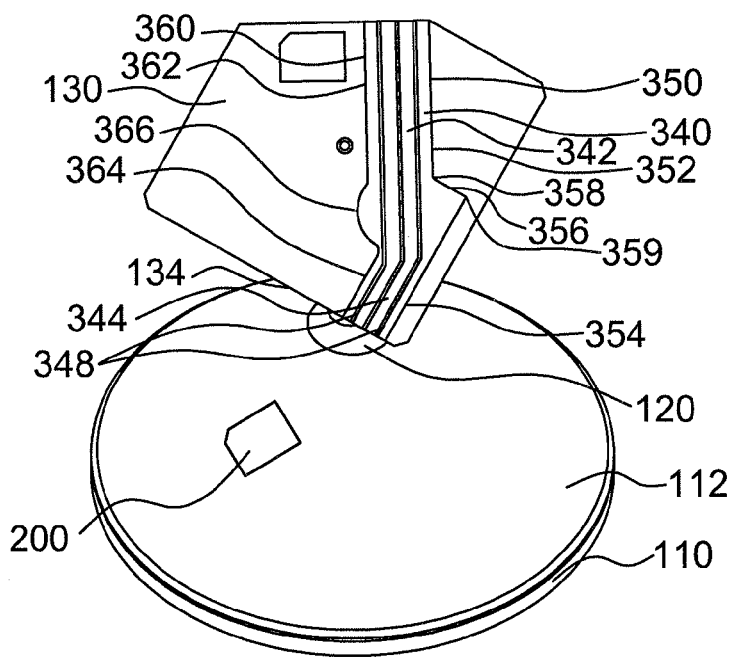

Referring to FIG. 3, the apparatus 300 of checking dimensions of a memory card according to the second embodiment of the present disclosure similarly includes the base 110, the supporter 120 and the checking platform 130. The apparatus 300 further has a checking slot 340 formed on the inclined checking platform 130.

The checking slot 340 extends downward from a side 132 of the checking platform 130 and arrives at another side 134 of the checking platform 130. The checking slot 340 is defined by a bottom wall 370 and two opposing side walls 350, 360. The side wall 350 includes a front section 352, a rear section 354 and a middle section 356 connecting to the front and rear sections 352, 354. The front, middle and rear sections 352, 356, 354 of the side wall 350 substantially extends straightly, wherein the front section 352 intersects with the middle section 356 at a connecting location 358, and the middle section 356 intersects with the rear section 354 at a connecting location 359. The side wall 360 includes a front section 362, a rear section 364 and a middle section 366 connecting to the front and rear sections 362, 364. The front section 362 of the side wall 360 has a length smaller than that of the front section 352 of the side wall 350 and rear section 364 of the side wall 360 has a length smaller than that of the rear section 354 of the side wall 350. The front and rear sections 362, 364 of the side wall 360 substantially extends straightly, and are substantially parallel to the front and rear sections 352, 354 of the side wall 350, respectively. The distance between the front section 352 of the side wall 350 and the front section 362 of the side wall 360 is greater than that between the rear section 354 of the side wall 350 and the rear section 364 of the side wall 360. The middle section 356 of the side wall 350 extends from the connecting location 358 and away the middle section 366 of the side wall 360. The angle α of intersection between the middle section 356 and the rear section 35 is greater than 90 degrees and smaller than 180 degrees. The middle section 366 of the side wall 360 is of curved shape and has a concave toward the side wall 350. The distance from the connecting location 358 to the middle section 366 of the side wall 360 is greater than that between the front section 352 of the side wall 350 and the front section 362 of the side wall 360. In addition, a virtual plane 368 extending from the front section 362 of the side wall 360 intersects with the middle section 366. According to the apparatus 300 in this embodiment, the checking slot 340 has a front section 342, a middle section 346 and a rear section 344, wherein the front section 342 is wider than the rear section 344 and is narrower than the middle section 346.

Referring to FIGS. 4a to 4d, they illustrate how to check dimensions of a memory card 200 by using the apparatus 300. In operation, the memory card 200 is placed in the front section 342 of the checking slot 340 in such a manner that the cutting side 230 is arranged upward and the long side 210 not connecting with the cutting side 230 is arranged downward (see FIG. 4a). The memory card 200 will slide downward in the inclined checking slot 340 because of gravity. When the memory card 200 hits the middle section 366 of the side wall 360, the middle section 366 will exert a force on the memory card 200 to have it rotate and push to an accommodation room defined by the middle and rear sections 356, 354 of the side wall 350 (see FIG. 4b). If the memory card 200 has a width smaller than that of the rear section 344 of the checking slot 340, it will rotate and slide into the rear section 344 of the checking slot 340 in a manner that the short side 220 connecting with the cutting side 230 faces downward (see FIG. 4c). Finally, the memory card 200 will slide out of the checking slot 340 and drop down to the base 110 (see FIG. 4d).

According to the apparatus 300 of the present disclosure, if the memory card 200 may be placed in the front section 342 of the checking slot 340 in the manner that the long side 210 faces downward, it indicates that the memory card 200 has a length smaller than the width of the front section 342 of the checking slot 340. When the memory card 200 may rotate and slide into the rear section 344 of the checking slot 340, it indicates that the width of the memory card 200 is smaller than that of the rear section 344 of the checking slot 340. Therefore, according to the apparatus 300, the front section 342 of the checking slot 340 is arranged to check the length of the memory card 200, the rear section 344 of the checking slot 340 is arranged to check the width of the memory card 200, and the middle section 346 of the checking slot 340 is configured for the memory card 200 to rotate. According to the apparatus 300 of the present disclosure, when the memory card 200 may slide out of the checking slot 340, it indicates that the dimensions of the memory card 200 are qualified. It is to be noted that the width of the front section 342 of the checking slot 340 should be slightly greater than the standard length of a memory card 200 and the width of the rear section 344 of the checking slot 340 should be slightly greater than the standard width of a memory card 200 in order to check precisely the dimensions of the memory card 200. Furthermore, to prevent the memory card 200 from attaching to the checking slot 340 due to the atmospheric pressure, a plurality of elongated protrusions 348 is formed on the bottom wall 370 of the checking slot 340. The protrusions 348 extend lengthwise along the checking slot 340. This may reduce the contact of the memory card 200 with the bottom wall 370 of the checking slot 340. Therefore, the memory card 200 may slide in the checking slot 340 more smoothly.

According to the apparatus 100 and 300 of the present disclosure, the checking platforms 130 are rotatable with respect to the supporters 120 to enable to adjust the inclined directions of the checking slots 140, 340. A layer 112 of electrostatic dissipation material may be disposed on the base 110 and the surface of the checking platform 130 may be processed by metal hardening treatment so as to dissipate electrostatic charge.

According to the apparatus of the present disclosure, the dimensions of memory cards may be checked by only placing these memory cards in the checking slot. In addition, it should be appreciated that the apparatus of the present disclosure may be used to check dimensions of other objects that have substantially rectangular or square shapes.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An apparatus of checking dimensions of an object, the apparatus having a checking platform, characterized in that:
the checking platform has a checking slot formed thereon, the checking slot extends from one side of the checking platform and arrives at another side of the checking platform, the checking slot is defined by a first side wall, a second side wall and a bottom wall, the first side wall has a front section connecting to a rear section, the front and rear sections intersect with each other at a connecting location, the second side wall has a middle section connecting to a front section and a rear section, wherein the distance between the front section of the first side wall and the front section of the second side wall is greater than that between the rear section of the first side wall and the rear section of the second side wall, and is smaller than that from the connecting location to the middle section of the second side wall, the angle of intersection between the front section of the first side wall and the rear section of the first side wall is greater than 90 degrees and smaller than 180 degrees.

2. The apparatus as claimed in claim 1, wherein the middle section of the second side wall is of curved shape and has a concave toward the first side wall.

3. The apparatus as claimed in claim 1, wherein the front and rear sections of the first side wall are longer than the front and rear sections of the second side wall, respectively.

4. The apparatus as claimed in claim 1, wherein a plurality of protrusions is formed on the bottom wall of the checking slot, the protrusions extend lengthwise along the checking slot.

5. The apparatus as claimed in claim 1, further comprising:
a base; and
a supporter extending from the base,
wherein the checking platform is mounted at the supporter.

6. The apparatus as claimed in claim 5, wherein the checking platform is rotatable with respect to the supporter.

7. The apparatus as claimed in claim 5, further comprising a layer of electrostatic dissipation material disposed on the base.

8. The apparatus as claimed in claim 5, wherein a surface of the checking platform is processed by metal hardening treatment.

9. An apparatus of checking dimensions of an object, the apparatus having a checking platform, characterized in that:
the checking platform has a checking slot formed thereon, the checking slot extends from one side of the checking platform and arrives at another side of the checking platform, the checking slot is defined by a first side wall, a second side wall and a bottom wall, the checking slot has a middle section connecting to a front section and a rear section, the front section is wider than the rear section and is narrower than the middle section, an accommodation room is formed at the middle section, a portion of the second side wall located at the middle section of the checking slot is formed to have the checked object rotate and push the checked object to the accommodation room, wherein the rear section is deflected with respect to the front section at an angle that is greater than 90 degrees and smaller than 180 degrees.

10. The apparatus as claimed in claim 9, wherein the portion of the second side wall located at the middle section of the checking slot is of curved shape and has a concave toward the first side wall.

11. The apparatus as claimed in claim 9, wherein a virtual plane extending from a portion of the second side wall located at the front section of the checking slot intersect with the portion of the second side wall located at the middle section of the checking slot.

12. The apparatus as claimed in claim 9, wherein a plurality of protrusions is formed on the bottom wall of the checking slot, the protrusions extend lengthwise along the checking slot.

13. The apparatus as claimed in claim 9, further comprising:
a base; and
a supporter extending from the base,
wherein the checking platform is mounted at the supporter.

14. The apparatus as claimed in claim 13, wherein the checking platform is rotatable with respect to the supporter.

15. The apparatus as claimed in claim 13, further comprising a layer of electrostatic dissipation material disposed on the base.

16. The apparatus as claimed in claim 9, wherein a surface of the checking platform is processed by metal hardening treatment.

* * * * *